(12) United States Patent
Chang et al.

(10) Patent No.: US 6,937,908 B2
(45) Date of Patent: Aug. 30, 2005

(54) METHOD FOR TUNING PID CONTROLLERS APPLICABLE TO NONLINEAR SYSTEMS

(75) Inventors: Pyung Hun Chang, Daejeon (KR); Je Hyung Jung, Daejeon (KR)

(73) Assignee: Korea Advanced Institute of Science & Technology, Daejon (KR)

( * ) Notice: Subject to any disclaimer, the term of this patent is extended or adjusted under 35 U.S.C. 154(b) by 105 days.

(21) Appl. No.: 10/697,816

(22) Filed: Oct. 29, 2003

(65) Prior Publication Data

US 2004/0153173 A1 Aug. 5, 2004

(30) Foreign Application Priority Data

Feb. 3, 2003 (KR) .................................. 10-2003-0006597

(51) Int. Cl.[7] .............................................. G05B 13/02
(52) U.S. Cl. ............................. 700/37; 700/28; 700/30; 700/31; 700/41; 700/42; 318/609; 318/610
(58) Field of Search ............................... 700/30–31, 28, 700/37, 42, 41, 32; 318/609, 610, 561

(56) References Cited

U.S. PATENT DOCUMENTS

| | | | |
|---|---|---|---|
| 4,466,054 A | | 8/1984 | Shigemasa et al. |
| 4,539,633 A | * | 9/1985 | Shigemasa et al. ............ 700/42 |
| 4,754,391 A | | 6/1988 | Suzuki |
| 5,057,993 A | | 10/1991 | Kanda |
| 5,229,699 A | | 7/1993 | Chu et al. |
| 5,331,541 A | | 7/1994 | Ueda et al. |
| 5,568,377 A | * | 10/1996 | Seem et al. .................... 700/37 |
| 5,587,899 A | * | 12/1996 | Ho et al. ........................ 700/37 |
| 5,742,503 A | | 4/1998 | Yu |
| 5,818,714 A | * | 10/1998 | Zou et al. ........................ 70/37 |
| 5,847,952 A | * | 12/1998 | Samad ........................... 700/48 |
| 5,971,579 A | | 10/1999 | Kim |
| 6,081,751 A | * | 6/2000 | Luo et al. ...................... 700/42 |
| 6,330,484 B1 | * | 12/2001 | Qin ............................... 700/50 |
| 6,510,351 B1 | * | 1/2003 | Blevins et al. ................ 700/18 |
| 6,697,767 B2 | * | 2/2004 | Wang et al. ................. 702/189 |
| 6,847,954 B1 | * | 1/2005 | Wojsznis et al. .............. 706/23 |

OTHER PUBLICATIONS

Time delay observer: a robust observer for nonlinear plants using time–delayed signals, Chang, P.H.; Lee, J.W.; American Control Conference, 1995. Proceedings of the vol. 3, Jun. 21–23, 1995 Page(s): 1638–1642 vol. 3.*

A reduced order time–delay control for highly simplified brushless DC motor□□Chang, P.H.; Lee, J.H.; Park, S.H.; American Control Conference, 1998. Proceedings of the 1998□□vol. 6, Jun. 24–26, 1998 Page(s):3791–3795 vol. 6.*

Time–varying input shaping technique applied to vibration reduction of an industrial robot,Hyung–Soon Park; Chang, P.H.; Jong–Sung Hur;Intelligent Robots and Systems, 1999. IROS '99. Proceedings. 1999 IEEE/RSJ International Conference on vol. 1, 17–21.*

* cited by examiner

Primary Examiner—Ramesh Patel
(74) Attorney, Agent, or Firm—Graybeal Jackson Haley, LLP

(57) ABSTRACT

A method for tuning a PID controller includes the steps of inducing equivalent relationships between PID gains of the PID controller and parameters of time delay control (TDC), selecting a natural frequency vector and a damping ratio vector so as to acquire a desired error dynamics of the closed PID control loop system, selecting a sampling time of the closed PID control loop system, determining the parameters of TDC on the basis of the natural frequency vector, the damping ratio vector and a closed loop stability condition for TDC, and selecting PID gains of the PID controller on the basis of the equivalent relationships.

5 Claims, 10 Drawing Sheets

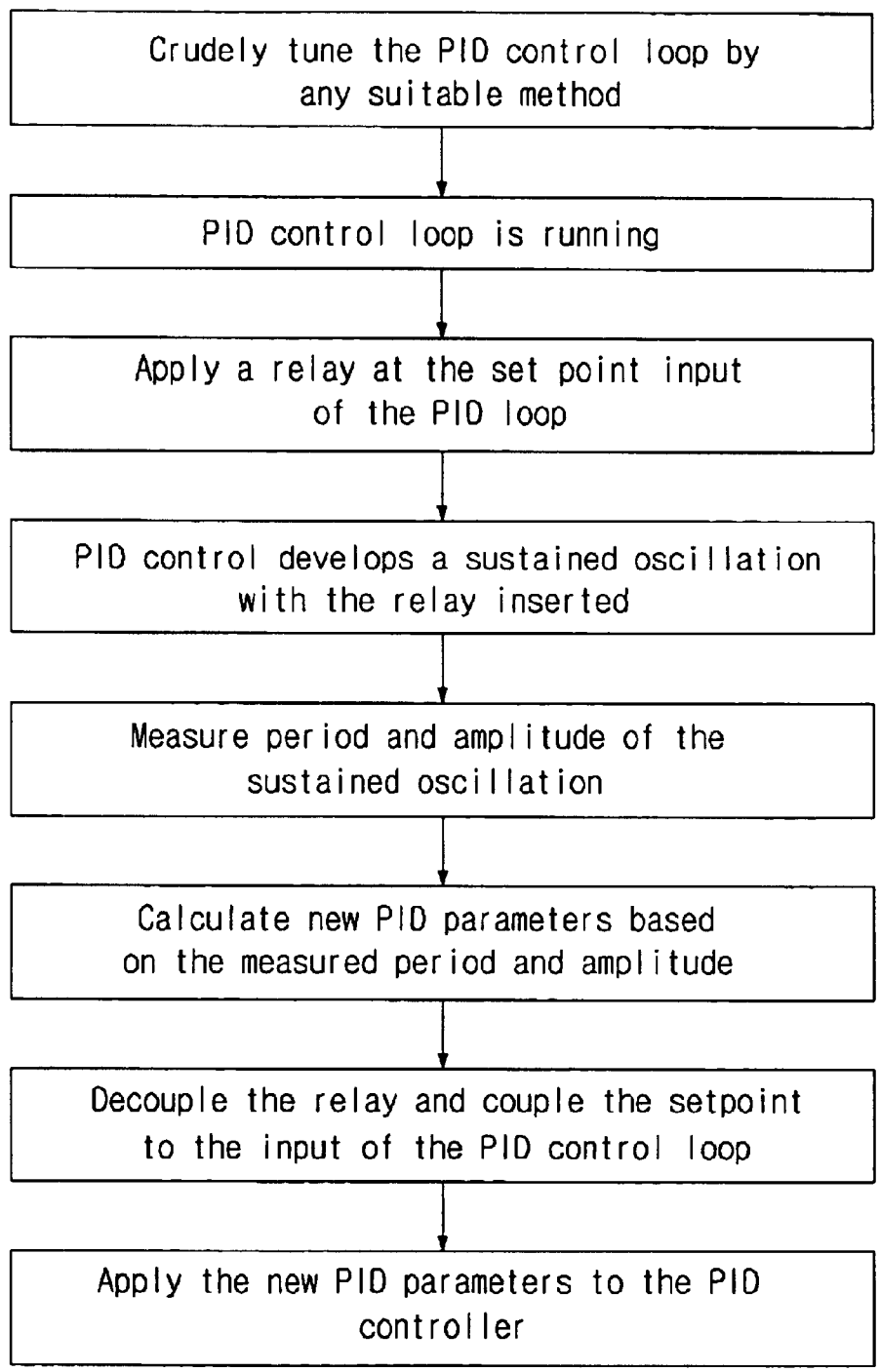

METHOD FOR TUNING PID CONTROLLERS APPLICABLE TO NONLINEAR SYSTEMS

This application claims priority from Korean Patent Application No. 10-2003-0006597 filed 03 Feb. 2003, which is herein incorporated by reference.

FIELD OF THE INVENTION

The present invention relates to a method for designing PID controllers and, more particularly, to a method for tuning PID controllers which are applicable to nonlinear systems such as robot manipulators.

BACKGROUND OF THE INVENTION

A plurality of patents has disclosed gain tuning methods of PID controllers. These patents may be categorized into two types of methods; one is a gain tuning method of PID controllers using hardware equipments and the other using software algorithms.

Among these patents, the second type of methods, i.e., gain tuning methods using software algorithms, to which the present invention pertains, can be exemplified as follows: U.S. Pat. No. 6,081,751 titled "System and method for closed-loop autotuning of PID controllers", U.S. Pat. No. 5,971,579 titled "Unit and method for determining gains of a PID controller using a genetic algorithm", U.S. Pat. No. 5,742,503 titled "Use of saturation relay feedback in PID controller tuning", U.S. Pat. No. 5,331,541 titled "PID control unit", U.S. Pat. No. 5,229,699 titled "Method and an apparatus for PID controller tuning", U.S. Pat. No. 5,057,993 titled "Method and system for acquiring parameters in process control", U.S. Pat. No. 4,754,391 titled "Method of determining PID parameters and an autotuning controller using the method", and U.S. Pat. No. 4,466,054 titled "Improved proportional integral-derivative control apparatus".

Based on online tuning, the above-mentioned patents are directed to methods for autotuning of PID controllers using algorithms which measure set point values and process variables to suggest suitable gain values.

U.S. Pat. No. 6,081,751, as shown in FIG. 1A, discloses a method for calculating new PID controller parameters either directly through the formulae associated with the Ziegler-Nichols reaction curve method or through the intermediate step of calculating an ultimate period and frequency from the time constant and dead time which are calculated from the period and amplitude of oscillation generated by a relay.

U.S. Pat. No. 5,971,579 is directed to a method for determining gains of a PID controller utilizing a genetic algorithm unit shown in FIG. 1B.

U.S. Pat. No. 5,742,503 provides a method for autotuning parameters of a PID controller, wherein parameters of a transfer function are computed through two steps and precise parameters of the PID controller are determined from the computed parameters of the transfer function.

U.S. Pat. No. 5,331,541 discloses a PID control device which identifies the rise characteristics of a controlled system by a step response method on changing a reference, moves to PID control when idle time and slope successively obtained on the rise reach a predetermined value, and computes PID control parameters based on the idle time and slope obtained up to that point.

U.S. Pat. No. 5,229,699 suggests a method for tuning PID controllers, in which a proportional control gain is increased until a desired oscillation is obtained, an amplitude and period are measured from the oscillation, an ultimate gain and an ultimate period is calculated in accordance with the amplitude and period, and the parameters of the PID controller are set in dependent upon the ultimate gain and period.

U.S. Pat. No. 5,057,993 introduces a method for acquiring parameters in the process control. According to this method, a manipulated variable to which an identification signal from an identification signal generator is added is inputted to a process to produce a controlled variable output which is then sampled to obtain a dead time and a maximum gradient, and the initial values of PID control parameters are calculated on the basis of the dead time and the maximum gradient. The initial values of the PID control parameters and the like are set in the adaptation section. In the adaptation section, a pulse transfer function of the process is acquired, and PID control parameters are calculated from the acquired pulse transfer function by using a partial matching method in a frequency region.

U.S. Pat. No. 4,754,391 discloses a method of determining the PID parameters for the PID controllers by monitoring a limit cycle generated in a controlled process to obtain characteristics of the process and determining optimum PID parameters to be used for succeeding process control on the basis of the results of the limit cycle monitoring.

U.S. Pat. No. 4,466,054 suggests a process control apparatus which comprises a nonlinear controller connected in parallel with a PID controller, a circuit for identifying a dynamic characteristic of a process and a circuit for determining gains of the PID controller according to the dynamic characteristic, which is illustrated in FIG. 1C.

All of the prior arts described above suggest methods for autotuning a PID controller to acquire a desired response during an online control process and realization of the methods in a hardware system.

Such conventional methods, however, require additional systems, thereby making the structure of PID controllers to be complicated. Further, these methods suffer from the disadvantage of requiring a lot of effort for calculating necessary intermediate values.

In addition, the object systems to which these conventional arts can be applied are limited to linear systems.

SUMMARY OF THE INVENTION

It is, therefore, an object of the present invention to provide a method for tuning a PID controller applicable to nonlinear MIMO systems represented in second order phase variable form without adding any supplementary devices to the PID controller.

In accordance with an aspect of the present invention, there is provided a method for tuning a PID controller, wherein the PID controller is comprised in a closed PID control loop system, the PID control loop receiving an input, the PID controller being coupled to an object system being controlled, wherein the object system outputs process variables which is supplied for comparison to the input, wherein a result of said comparison is supplied to the PID controller, the method comprising the steps of: inducing equivalent relationships between PID gains of the PID controller and parameters of time delay control (TDC); selecting a natural frequency vector and a damping ratio vector so as to acquire a desired error dynamics of the closed PID control loop system; selecting a sampling time of the closed PID control loop system; determining the parameters of TDC on the basis of the natural frequency vector, the damping ratio vector and a closed loop stability condition for TDC; and selecting PID gains of the PID controller on the basis of the equivalent relationships.

BRIEF DESCRIPTION OF THE DRAWINGS

The above and other objects, features and other advantages of the present invention will be more clearly understood from the following detailed description taken in conjunction with the accompanying drawings, in which:

FIG. 1A is a flow chart showing a conventional method for tuning a PID controller;

DETAILED DESCRIPTION OF THE PREFERRED EMBODIMENTS

Figure 1B:
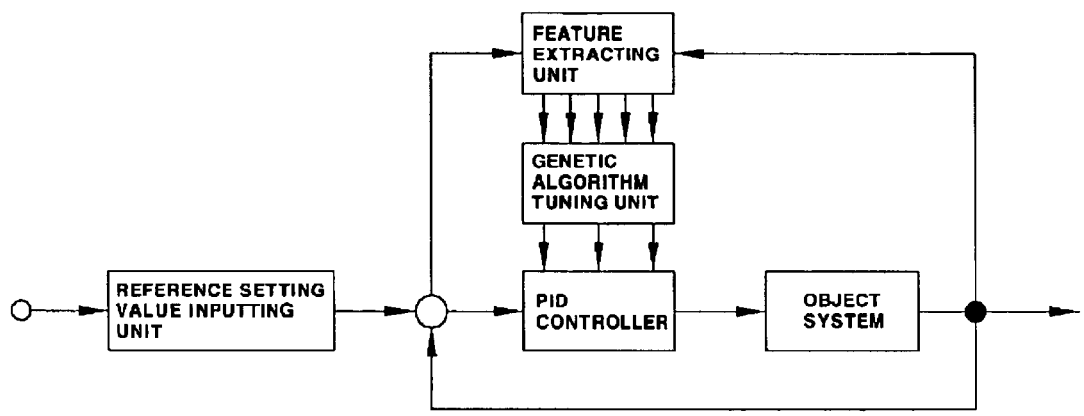
FIG. 1B is a block diagram showing another conventional method for tuning a PID controller.
Figure 1C:
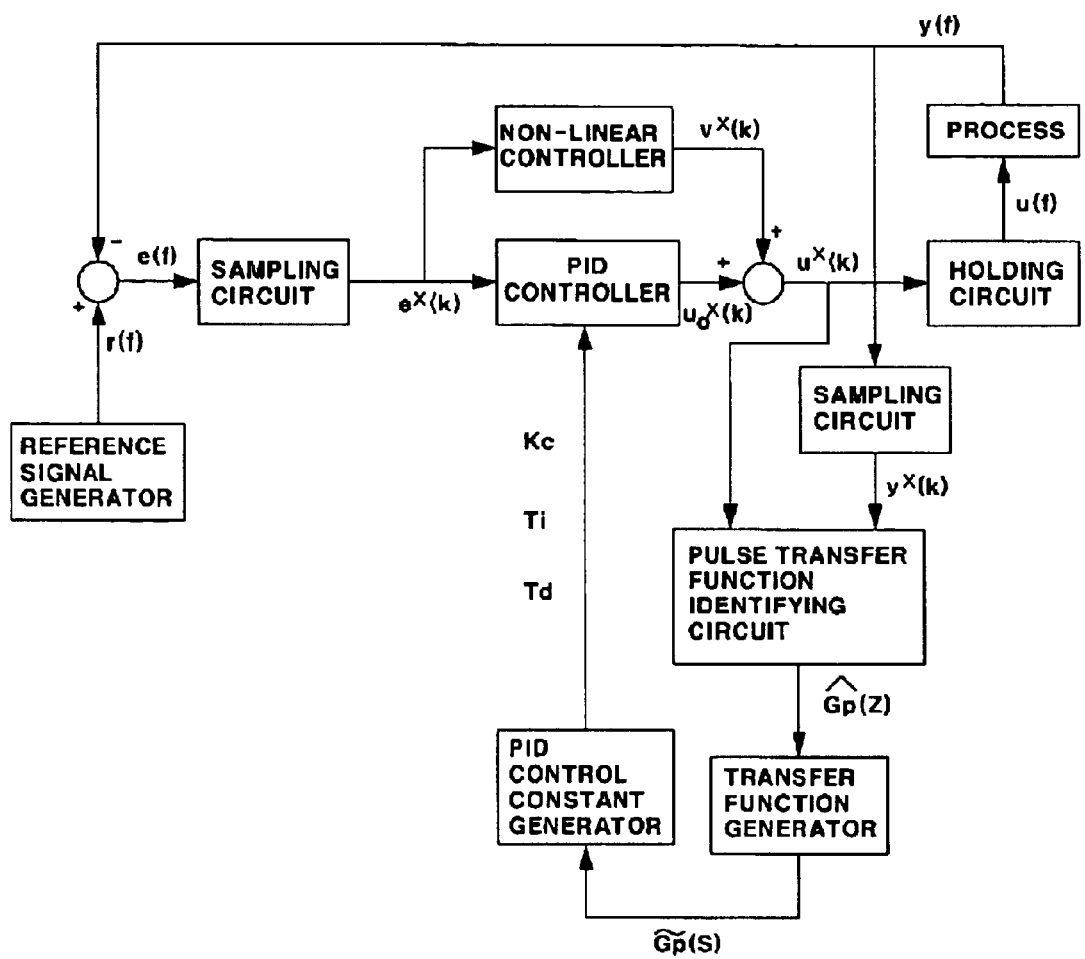
FIG. 1C is a block diagram showing further another conventional method for tuning a PID controller.

The application of the preferred embodiments of the present invention is best understood with reference to the accompanying drawings, wherein like reference numerals are used for like and corresponding parts, respectively.

Figure 2:
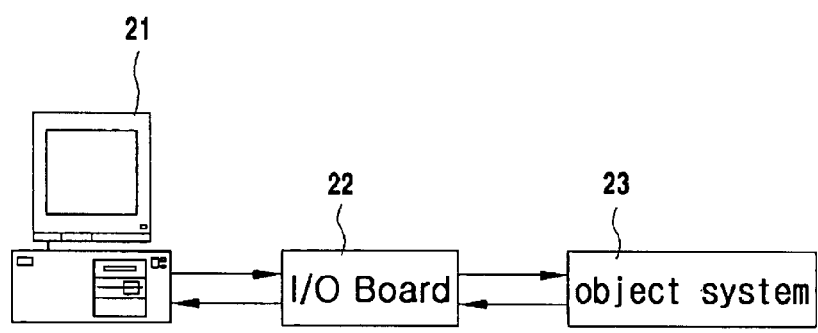
FIG. 2 is a schematic view showing the overall configuration of a control system in accordance with an embodiment of the present invention.

FIG. 2 shows a control system structure to which the present invention is applied. The control system includes a digital device (e.g., computer) 21, an I/O board 22, and an object system 23. A program for PID control runs in the digital device 21.

The object system 23 is a nonlinear MIMO system in a second order phase variable form and may be represented by equation 1.

$$\ddot{x}+A(x,\dot{x})=B(x,\dot{x})u \quad (1)$$

where, when the order of the system is n, x is an nX1 vector of variables to be controlled, $A(x,\dot{x})$ is an nX1 nonlinear vector representing dynamic characteristics such as friction of the system, $B(x,\dot{x})$ is an nXn matrix representing input distributions, and u is an nX1 input vector of the object system. For instance, a robot manipulator may be represented by equation 1, in which case x is a vector showing the rotation angles for the individual axes of the robot manipulator.

Figure 3:
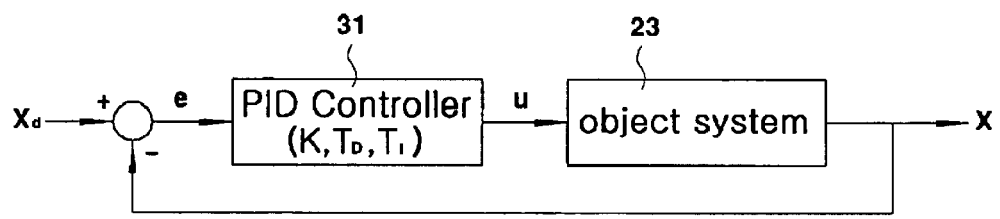
FIG. 3 is a block diagram showing a control object system and a PID controller in accordance with the present invention.

Referring to FIG. 3, the overall system of the present invention is shown in a block diagram where $x_d$ is a desired trajectory.

First, the relationship between PID control and time delay control will be explained. Time delay control method is known as a robust control method for a sampled data system. Based on the relationship, a gain tuning method in accordance with the present invention will be described in detail.

The sampled data system includes both a discrete time system and a continuous time system. When the system represented by equation 1 is to be controlled, a digital device 21 such as a computer may be used as a controller. In this case, the digital device 21 is a discrete time system while the object system 23 is a continuous time system.

As explained by K. Youcef-Toumi and S.-T. Wu in "Input/output liberalization using time delay control-Trans. Of ASME, J. Dyn. Sys., Meas., Contr., vol. 114, pp.10–19 (1992), the time delay control (TDC) is a nonlinear robust control method.

When TDC is applied to the system represented by equation 1, it is expressed by the form of equation 2, below.

$$u(t)=u(t-\lambda)+\bar{B}^{-1}(-\ddot{x}(t-\lambda)+\ddot{x}_d(t)+K_D\dot{e}(t)+K_Pe(t)) \quad (2)$$

wherein $e(t)=x_d(t)-x(t)$ is an error vector, $\lambda$ is a time delay value, $K_D$ and $K_P$ are nXn constant diagonal matrix determining the overall closed loop system including the TDC and the object system to have desired error dynamics, and $\bar{B}^{-1}$ is a parameter selected to satisfy equation 3, below $$\|I-B\bar{B}^{-1}\|_{i2} < \frac{1}{1+[(1+\beta_1\gamma_P)\gamma_D+\beta_2\gamma_{PD}]\lambda} \quad (3)$$

where the subscript i2 indicates an induced matrix 2-norm and $$\gamma_P=\|K_P\|_{i2}, \gamma_D=\|K_D\|_{i2}, \gamma_{PD}=\|K_P-K_D^2\|_{i2}.$$

The induced matrix norm is defined as follows: As mXn matrix A of real elements defines a linear mapping y=Ax from $R^m$ into $R^n$, the induced p-norm of A is defined by $$\|A\|_p = \sup_{x\neq 0}\frac{\|Ax\|_p}{\|x\|_p} = \max_{\|x\|_p=1}\|Ax\|_p \quad (4)$$

which for p=1, 2, ∞, is given by $$\|A\|_1 = \max_j\sum_{i=1}^m|a_{ij}|, \|A\|_2 = [\lambda_{max}(A^TA)]^{1/2}, \quad (5)$$

$$\|A\|_\infty = \max_i\sum_{j=1}^n|a_{ij}|$$

where $\lambda_{max}(A^T A)$ is the maximum eigenvalue of $A^TA$.

In equation 3, $\beta_1$ and $\beta_2$ are gains of $L_2$ (see equation 9 below) whose meanings are explained below. First, $\epsilon(t)$ is defined by equation 6

$$\epsilon(t)=\ddot{e}(t)+K_D\dot{e}(t)+K_Pe(t) \quad (6)$$

H and G is defined as H: $\epsilon|\to e$ and G:$\epsilon|\to \dot{e}$, respectively, and $\|\cdot\|_{T2}$ is defined as $L_n^2$ norm of •(t) truncated at time T. Considering the operator $H_i$:$\epsilon_i|\to e_i$ for each element of the vector $\epsilon(t)$, the transfer function between $\epsilon_i$ and $e_i$ can be expressed by equation 7:

$$\frac{e_i(s)}{\varepsilon_i(s)} = h_i(s) = \frac{1}{s^2 + k_{Di}s + k_{Pi}} \quad (7)$$

Likewise, considering the operator $G_i:\epsilon_i \mapsto \dot{e}_i$, the transfer function between $\epsilon_i$ and $\dot{e}_i$ can be expressed by equation 8:

$$\frac{\dot{e}_i(s)}{\varepsilon_i(s)} = h_i(s) = \frac{s}{s^2 + k_{Di}s + k_{Pi}} \quad (8)$$

where $k_{Di}$ and $k_{Pi}$ are $i^{th}$ diagonal entries of $K_D$ and $K_P$, respectively. Then, the gain of the transfer function $L_2$ is defined by equation 9:

$$\|H_i\|_2 = \max_\omega |h_i(j\omega)| \quad (9)$$

$$\|G_i\|_2 = \max_\omega |g_i(j\omega)|$$

Further, $\|H\|_2 = \|G_H\|_{i2}$ and $\|H\|_2 = \|G_{H\|i2}$. Also, $$(M_H)_{ii} = \max_\omega |h_i(j\omega)|$$

and $$(M_G)_{ii} = \max_\omega |g_i(j\omega)|.$$

Thus, $\beta_1$ and $\beta_2$ are given by equation 10:

$$\beta_1 = \|H\|_2$$

$$\beta_2 = \|G\|_2 \quad (10)$$

For a sampled data system, the time t is expressed by the combination of the sampling time ($\Delta t$) of the control system with the step number (a=1, 2, . . . , k), that is, $t = a \cdot \Delta t$. Accordingly, where TDC is used in the sampled data system, the time delay value $\lambda$ is the sampling time $\Delta t$ of the control system. Further, $\ddot{x}(t-\lambda)$ is expressed by using the central differential method which is the error-lowest numerical differential methods while $\ddot{x}_d(t)$ and $\dot{e}(t)$ are expressed by using the backward differential methods, as shown in equation 11:

$$\ddot{x}(t-\lambda) \to \frac{x(k) - 2x(k-1) + x(k-2)}{\Delta t^2} \quad (11)$$

$$\ddot{x}_d(t) \to \frac{x_d(k) - 2x_d(k-1) + x_d(k-2)}{\Delta t^2}$$

$$\dot{e}(t) \to \frac{e(k) - e(k-1)}{\Delta t}$$

After substituting the parameters of equation 2 by equation 11, rearrangement into the form of the PID controller makes equation 12:

$$u(k) = u(k-1) + \overline{B}^{-1}\left(\frac{e(k) - 2e(k-1) + e(k-2)}{\Delta t^2} + K_D \frac{e(k) - e(k-1)}{\Delta t} + K_p e(k)\right) \quad (12)$$

In result, equation 12 is a TDC form of a sampled data system.

Generally, a PID controller 31 may be expressed in a form of equation 13:

$$u(t) = K(e(t) + T_D \dot{e}(t) + T_I^{-1}\int_0 e(r)dr) \quad (13)$$

where K is an nXn constant diagonal proportional gain matrix, $T_D$ is an nXn constant diagonal matrix representing derivative times, and $T_I$ is a constant diagonal matrix representing a reset or integral time.

However, in order to show the relationship with TDC, a PID controller which includes a DC component vector will be considered, as illustrated in equation 14:

$$u(t) = K(e(t) + T_D \dot{e}(t) + T_I^{-1}\int_0 e(\sigma)d\sigma) + DC \quad (14)$$

where the DC component is a constant value determined by the initial error($\dot{e}(0), e(0)$).

In consequence, designing the PID controller 31 means selecting K, $T_D$, $T_I$, and DC.

Application of the Laplace transform to equation 14 gives equation 15:

$$U(s) = K\left(1 + T_D s + \frac{1}{s}T_I^{-1}\right)E(s) + \frac{DC}{s} - KT_D e(0) \quad (15)$$

Multiplication of s to both sides and rearrangement change equation 15 into equation 16:

$$sU(s) = K(s + T_D s^2 + T_I^{-1})E(s) + DC - sKT_D e(0) \quad (16)$$

The inverse Laplace transform of equation 16 gives equation 17:

$$\dot{u}(t) = K(\dot{e}(t) + T_D \ddot{e}(t) + T_I^{-1} e(t)) + (DC + K(e(0) + T_D \dot{e}(0)) - u(0))\delta(t) \quad (17)$$

where $e(0)$, $\dot{e}(0)$ and $u(0)$ are values of $e(t)$, $\dot{e}(t)$ and $u(t)$ at $t=t_0$, respectively, and $\delta(t)$ is a Dirac delta function.

In equation 17, DC is obtained by equation 18:

$$DC = -K(e(0) + T_D \dot{e}(0)) + u(0) \quad (18)$$

where $u(0) = u_{TDC}(0)$.

Accordingly, equation (17) is simplified to equation 19:

$$\dot{u}(t) = K(\dot{e}(t) + T_D \ddot{e}(t) + T_I^{-1} e(t)) \quad (19)$$

Then, equation 19 may be rewritten to equation 20:

$$\dot{u}(t) = K((\dot{x}_d(t) - \dot{x}(t)) + T_D(\ddot{x}_d(t) - \ddot{x}(t)) + T_I^{-1}(x_d(t) - x(t))) \quad (20)$$

$\dot{x}(t)$, $\ddot{x}(t)$, $\dot{x}_d(t)$, $\ddot{x}_d(t)$ are obtained by the backward method, as shown in equation 21.

$$\dot{x}(t) \to \frac{x(k) - x(k-1)}{\Delta t} \quad \ddot{x}(t) \to \frac{\dot{x}(k) - \dot{x}(k-1)}{\Delta t} = \frac{x(k) - 2x(k-1) + x(k-2)}{\Delta t^2} \quad (21)$$

$$\dot{x}_d(t) \to \frac{x_d(k) - x_d(k-1)}{\Delta t} \quad \ddot{x}_d(t) \to \frac{\dot{x}_d(k) - \dot{x}_d(k-1)}{\Delta t} = \frac{x_d(k) - 2x_d(k-1) + x_d(k-2)}{\Delta t^2}$$

In a sampled data system, a PID controller can be expressed as equation 22:

$$u(k)=u(k-1)+\Delta t \cdot \dot{u}(k) \quad (22)$$

When equations 20 and 21 are substituted into equation 22, equation 23 is obtained:

$$u(k) = u(k-1) + \quad (23)$$
$$\Delta t \cdot K\left(T_D\left(\frac{e(k)-2e(k-1)+e(k-2)}{\Delta t^2}\right) + \left(\frac{e(k)-e(k-1)}{\Delta t}\right) + T_I^{-1}(x_d(k)-x(k))\right)$$

Therefore, for a sampled data system, the PID controller can be expressed as equation 23.

Comparison of equation 12 with equation 23 shows that the PID controller and the TDC take the same form in a sampled data system. Hence, Relationship 1 can be given between the gain of the PID controller and the parameter of the TDC:

$$\text{Relationship 1: } K = \frac{\overline{B}^{-1} \cdot K_D}{\Delta t} \quad T_D = K_D^{-1} \quad T_I = K_D \cdot K_P^{-1}$$

Also, the DC component can be obtained from equation 24:

$$DC = -K(e(0)+T_D\dot{e}(0))+K \cdot \Delta t(\dot{e}(0)+T_I^{-1}e(0)) \quad (24)$$

In Relationship 1, $\Delta t$ is the sampling time of the control system, $K_D$ and $K_P$ are parameters which define the error dynamics of the overall closed loop system and are determined by the intention of the designer. Thus, if only $\overline{B}^{-1}$ is determined, all of the gains of the PID controller can be automatically determined.

As mentioned above, $\overline{B}^{-1}$ is selected to satisfy equation 3 and, in general, determined by the following two methods:
(1) $\overline{B}^{-1} = \alpha$ ($\alpha$ is a constant, I is a unit matrix)
(2) $\overline{B}^{-1}$ is a constant diagonal matrix (($\overline{B}^{-1})_{ii}=\alpha_i$ (i = 1, ..., n)).

Figure 4A:
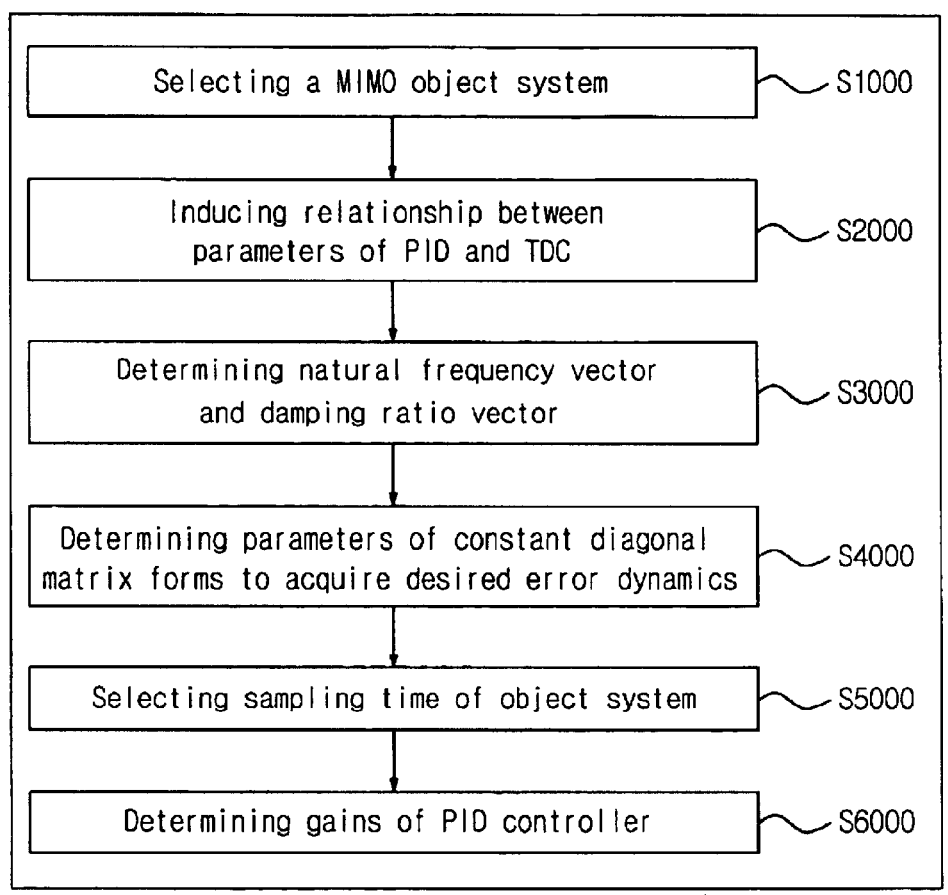
FIGS. 4A and 4B are flow charts showing the process of designing a PID controller.
Figure 4B:
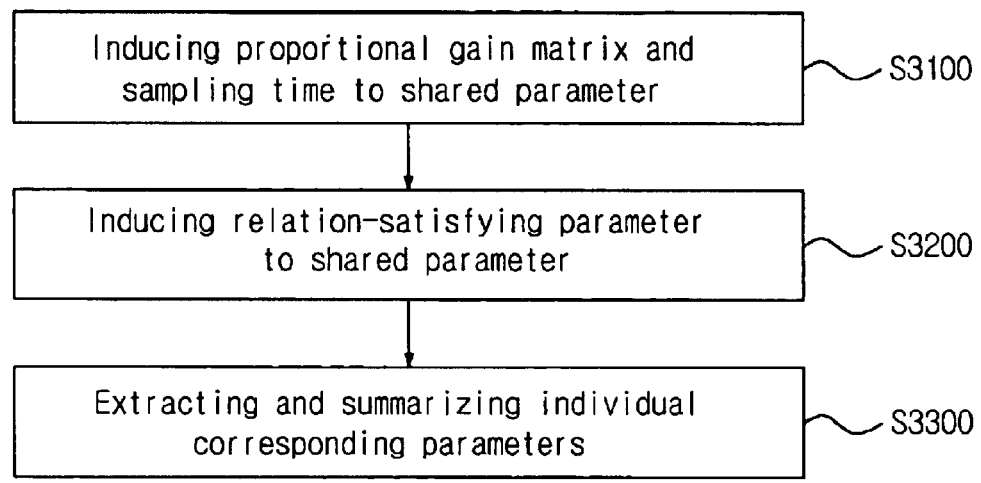

A detailed design process of the PID controller based on Relationship 1 will be explained with reference to FIGS. 4A and 4B.

First, an MIMO type object system represented as a second order variable form is selected (Step S1000).

Relationships between parameters of PID and TDC are derived in connection with the object system (Step S2000).

Then, a desired error dynamics of the object system is determined (Step S3000). The error dynamics is determined by the designer by selecting the natural frequency vector ($\omega$) and the damping ratio vector ($\varsigma$). $K_D$ and $K_P$ are determined on the basis of the natural frequency vector and damping ratio vector selected in Step S3000 (S4000). When $i^{th}$ terms of the natural frequency vector $\omega_n$ and the damping ration vector $\varsigma$ are $\omega_{ni}$ and $\varsigma_i$, respectively, $i^{th}$ diagonal entries of the matrixes $K_D$ and $K_P$ can be obtained through the relations $k_{Di}=2\varsigma_i\omega_{ni}$ and $k_{Pi}=\omega_{ni}^2$. Afterwards, the sampling time of the control system is determined (Step S5000). The sampling time is preferably set to be a small value, but influenced by the CPU speed of the digital device 210.

In Steps S3100 and S3200, $\overline{B}^{-1}$ is determined. By one of the two methods mentioned above, $\overline{B}^{-1}$ is set to satisfy equation 3. Finally, gains of the PID controller are selected on the basis of Relationship 1 and equation 24 in Step S3300.

EXAMPLE

An example will be described, in which the method of the present invention was applied to a virtual object system on computer.

Figure 5:
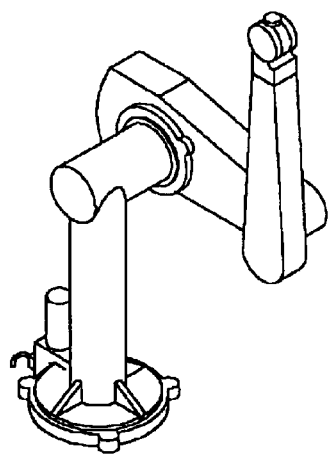
FIG. 5 is a perspective view showing a robot manipulator with six degrees of freedom which is an object system of a PID controller in accordance with the present invention.

A Puma type robot manipulator having six degrees of freedom, like that shown in FIG. 5, was selected as the object system. This robot is a model depicted in the article "The explicit dynamic model and inertial parameters of the PUMA 560 arm", IEEE Int. Conference on Robotics and Automations, pp. 510–518 (B. Armstrong, O. Khatib, and J. Burdick (1986)). The dynamics of the robot manipulator is expressed by equation 25:

$$M(\theta)\ddot{\theta}+V(\theta,\dot{\theta})+G(\theta)+F(\theta,\dot{\theta})=\tau \quad (25)$$

where $M(\theta)$ is a 6×6 inertia matrix, $\theta$ is a 6×1 vector representing the rotation angles with respect of six axes, $V(\theta,\dot{\theta})$ is a vector representing Coriolis force and centrifugal force, $G(\theta)$ is a gravity vector, $F(\theta,\dot{\theta})$ is a 6×1 vector representing forces which are not included in system modeling such as frictional force or disturbance and $\tau$ is a 6×1 torque vector applied on joints. Comparing equation 1 with equation 25, one can get $B(x,x) \rightarrow M(\theta)^{-1}$.

Detailed design process will be described according to the process of FIGS. 4A and 4B.

For convenience, assume that poles of error dynamics of all six axes are located as multiple roots at 5. In this case, the natural frequency $\omega_{ni}=5$ (i=1, ..., 6), damping ratio $\varsigma_i=1$(i=1, ..., 6). Here, $k_{Di}=10$ and $k_{Pi}=25$ (i=1, ..., 6) in all of the six axes. The sampling time of the controller is $\Delta t=0.001$ sec. Puma 560 has an arm part and a wrist part. Since the two parts greatly differ in inertia due to the difference in mass and structure between themselves, two values ($\alpha_1$ and $\alpha_2$) were used in which $\alpha_1$ is for axes 1, 2 and 3 and $\alpha_2$ for axes 4, 5 and 6.

$$\|I - M^{-1}\overline{M}\|_{i2} < \frac{1}{1 + [(1+\beta_1\gamma_P)\gamma_D + \beta_2\gamma_{PD}]\Delta t} \rightarrow \|I - M^{-1}\overline{M}\|_{i2} < 0.9732$$

$$\overline{M} = \begin{bmatrix} a_1 \cdot I_{3\times 3} & 0 \\ 0 & a_2 \cdot I_{3\times 3} \end{bmatrix} \rightarrow a_1 = 1.8 \quad a_2 = 0.2,$$

$$\|I - M^{-1}\overline{M}\|_{i2} = 0.7663 < 0.9732.$$

From Relationship 1 and equation 24, $$K_1 = K_2 = K_3 = \frac{K_D \alpha_1}{\Delta t} = 18000, \ T_{D1} = T_{D2} = T_{D3} = \frac{1}{K_D} = 0.1, \ T_{I1} = T_{I2} = T_{I3} = \frac{K_D}{K_P} = 0.4$$

$$K_4 = K_5 = K_6 = \frac{K_D \alpha_2}{\Delta t} = 2000, \ T_{D4} = T_{D5} = T_{D6} = \frac{1}{K_D} = 0.1, \ T_{I4} = T_{I5} = T_{I6} = \frac{K_D}{K_P} = 0.4$$

$$DC_i = -K_i(e_i(0)+T_{Di}\dot{e}_i(0))+K_i \cdot \Delta t(\dot{e}_i(0)+T_{Ii}^{-1}e(0))(i=1, \cdots, 6)$$

$$\tau_1(t) = K_1\left(e_1(t) + \frac{1}{T_{I1}}\int_0^t e_1(\sigma)d\sigma + T_{D1}\dot{e}_6(t)\right) + DC_1$$

$$\tau_6(t) = K_6\left(e_6(t) + \frac{1}{T_{I6}}\int_0^t e_6(\sigma)d\sigma + T_{D6}\dot{e}_6(t)\right) + DC_6$$

Eighteen gains of the PID controller were selected.

Two types of trajectories shown in FIG. 3 were applied as $x_d(t)$. One was a step trajetory having initial errors and the other was a sinusoidal type trajectory.

Case 1: Step Trajectory

The step trajectory of equation 26 was applied to each axis.

$$x_{d1}=x_{d2}=x_{d3}=1\text{rad}=57°$$

$$x_{d4}=x_{d5}=x_{d6}=3\text{rad}=172° \quad (26)$$

Figure 6A:
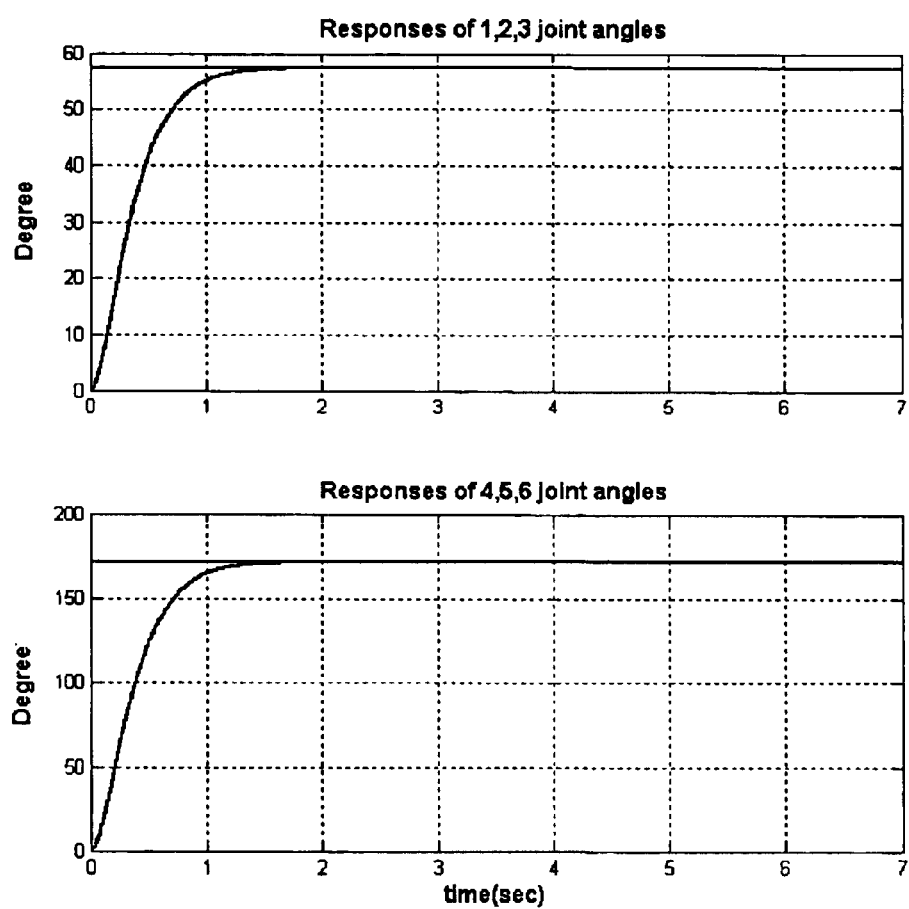
FIG. 6A is a graph showing response when a PID controller designed according to the present invention is applied to an object system subject to a step trajectory.
Figure 6B:
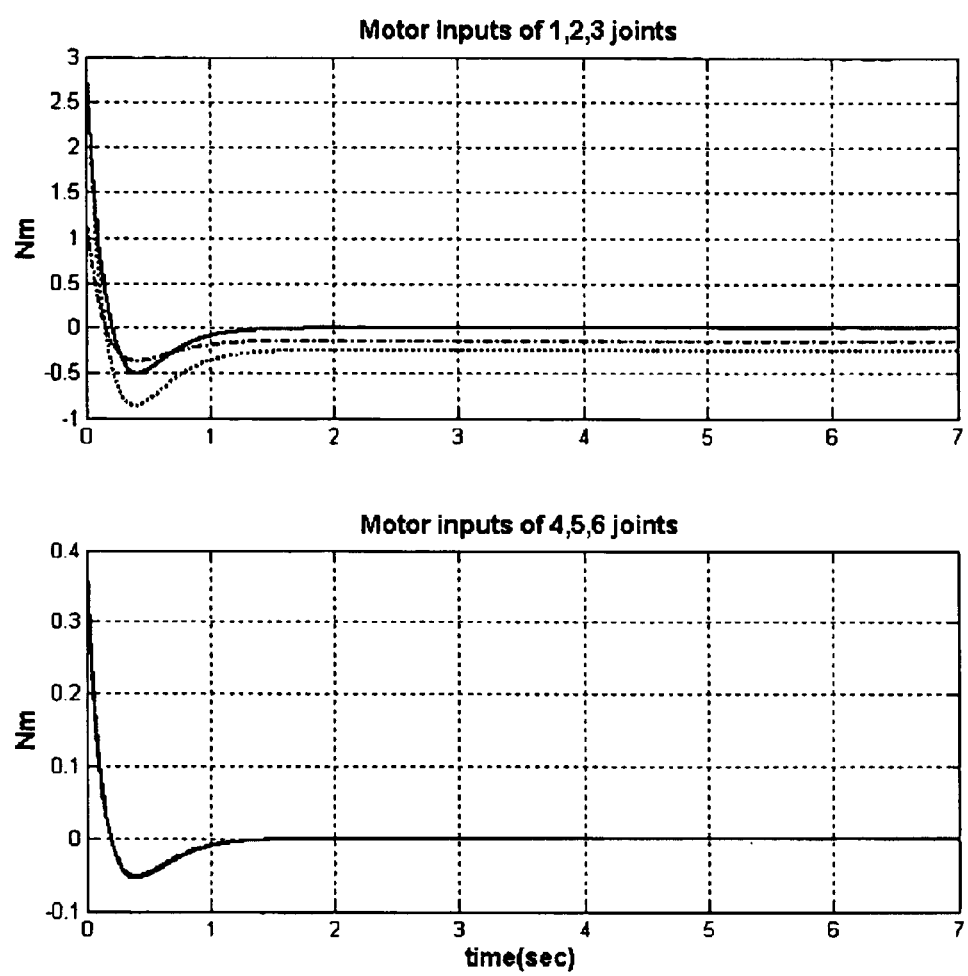
FIG. 6B is a graph showing control input obtained when a PID controller designed according to the present invention is applied to an object system subject to a step trajectory.

The control results based on the values of the PID controller designed according to the method of the present invention are given in FIGS. 6A and 6B, in which response x(t) (FIG. 6A) and input torque T (FIG. 6B) are plotted versus time. In the upper graphs of FIGS. 6A and 6B, axes 1 and 4 are represented by solid lines, axes 2 and 5 by dotted lines, and axes 3 and 6 by dashed lines. Likewise, the lower graphs of FIGS. 6A and 6B have solid lines for 1 and 4, dotted lines for axes 2 and 5, and dashed lines for axes 3 and 6. In all of the graphs, only solid lines are shown since the lines overlap. As apparent from the plots, all of the six axes were satisfactorily controlled when they were under the rule of the PID controller designed according to the present invention.

Case 2: Sinusoidal Type Trajectory

The sinusoidal trajectory of equation 27 was applied to each axis.

$$x_{d1}=x_{d2}=x_{d3}=80°\cdot\sin(w_d t)\cdot(1-e(-w_d t))$$

$$x_{d4}=x_{d5}=x_{d6}=240°\cdot\sin(w_d t)\cdot(1-e(-w_d t)) \quad (27)$$

Figure 7A:
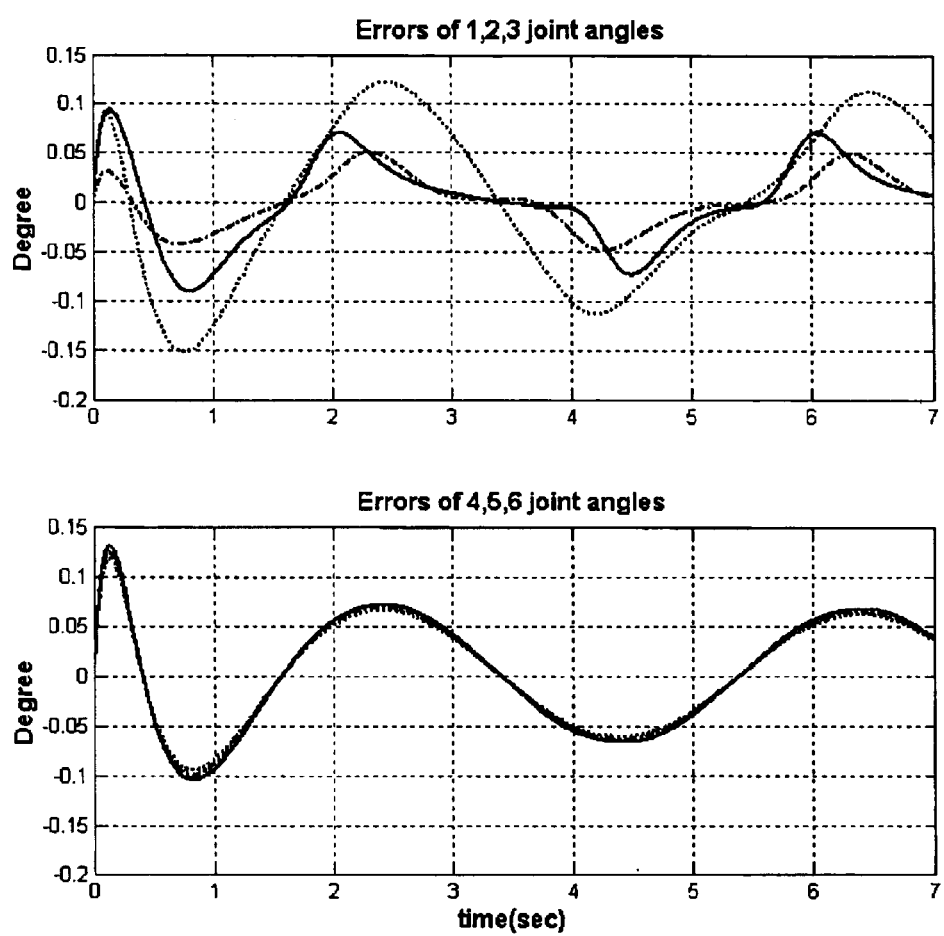
FIG. 7A is a graph showing response error when a PID controller designed according to the present invention is applied to an object system subject to a sinusoidal type trajectory.
Figure 7B:
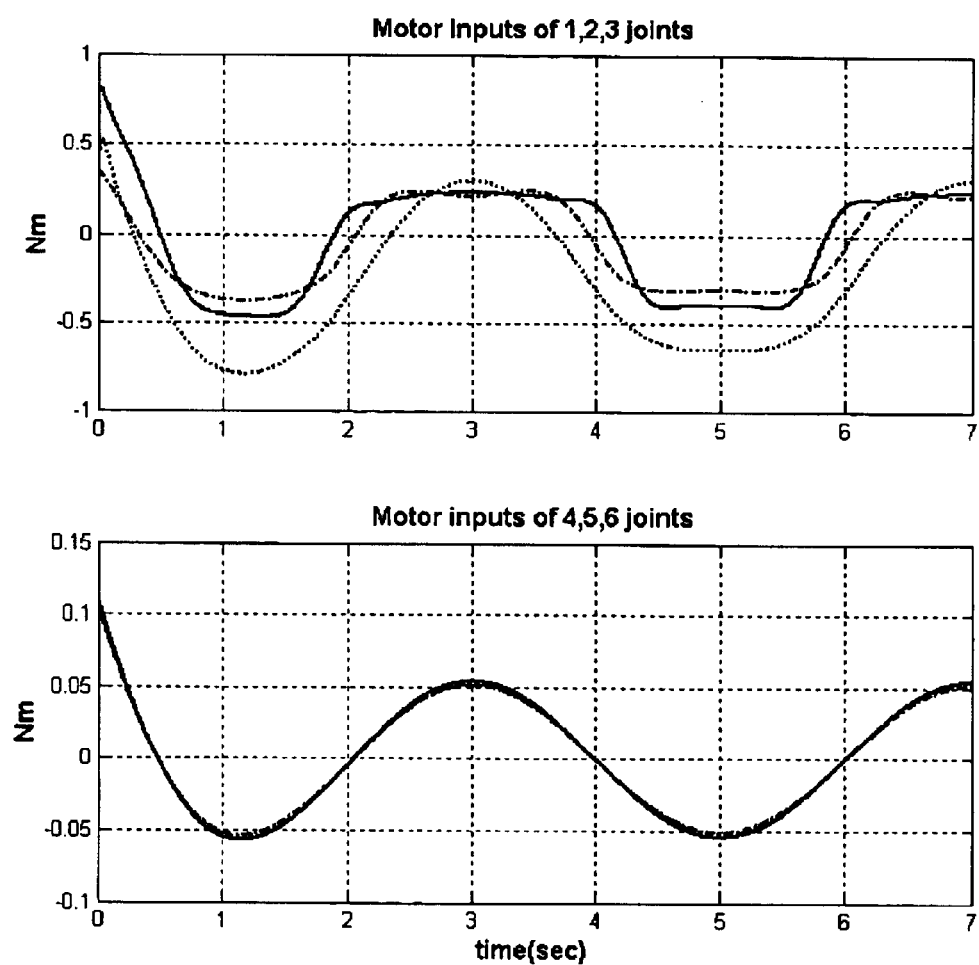
FIG. 7B a graph showing control input when a PID controller designed according to the present invention is applied to an object system subject to a sinusoidal type trajectory.

The control results based on the values of the PID controller designed according to the method of the present invention are given in FIGS. 7A and 7B, in which the response error e(t) (FIG. 7A) and input torque $\tau$ (FIG. 7B) are plotted versus time. In the upper graphs of FIGS. 7A and 7B, axes 1 and 4 are represented by solid lines, axes 2 and 5 by dotted lines, and axes 3 and 6 by dashed lines. Likewise, the lower graphs of FIGS. 7A and 7B have solid lines for axes 1 and 4, dotted lines for axes 2 and 5, and dashed lines for axes 3 and 6. In all of the graphs, only solid lines are seen since the lines overlap. As apparent from the plots, all of the six axes were satisfactorily controlled when they were under the rule of the PID controller designed according to the present invention.

As described hereinbefore, the present invention provides a gain selection method of PID controllers by which a great number of gains of PID controllers can be selected with a small number of parameters. As exemplified in the examples, the total number of PID controller gains to be selected in the six-axis robot manipulator is 18. However, only two parameters ($\alpha_1$ and $\alpha_2$) suffice the selection of as many as 18 gains.

Conventionally, the number of PID controller gains in an n-degree system totals 3n. However, the method of the present invention can reduce the parameters into one or a number less than n. In practice, when tuning a PID controller, all of 3n gains can be suitably tuned by tuning only one to n-1 gains even though every gain is not tuned one by one.

Additionally, in comparison to conventional methods, the present invention can be applied to linear and nonlinear systems and even to MIMO systems. Furthermore, the present invention enjoys the advantage of selecting and tuning gains of PID controllers only by the program run in the digital device 21 without additional equipment.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for tuning a PID controller, wherein the PID controller is comprised in a closed PID control loop system, the PID control loop receiving an input, the PID controller being coupled to an object system being controlled, wherein the object system outputs process variables which is supplied for comparison to the input, wherein a result of said comparison is supplied to the PID controller, the method comprising the steps of:

inducing equivalent relationships between PID gains of the PID controller and parameters of time delay control (TDC);

selecting a natural frequency vector and a damping ratio vector so as to acquire a desired error dynamics of the closed PID control loop system;

selecting a sampling time of the closed PID control loop system;

determining the parameters of TDC on the basis of the natural frequency vector, the damping ratio vector and a closed loop stability condition for TDC; and selecting PID gains of the PID controller on the basis of the equivalent relationships.

2. The method as defined in claim 1, wherein the object system being a multi input multi output system of degree n which is expressed in a sampled data system.

3. The method as defined in claim 2, wherein the number of the parameters of TDC is three, a first parameter being determined by the natural frequency vector, a second parameter being determined by the natural frequency vector and damping ratio vector and a third parameter being determined as a diagonal matrix.

4. The method as defined in claim 3, wherein all of diagonal elements of the third parameter has one constant value.

5. The method as defined in claim 3, wherein diagonal elements of the third parameter have constant values different to each other.

* * * * *